United States Patent [19]

McMillan et al.

[11] Patent Number: 5,340,524

[45] Date of Patent: Aug. 23, 1994

[54] VARIABLE ANGULAR INSERTION METHOD FOR LINING TUBULAR MEMBERS

[75] Inventors: Jim S. McMillan, Benbrook; Simon Tarsha, Fort Worth, both of Tex.

[73] Assignee: Pipe Rehab International, Inc., Memphis, Tenn.

[21] Appl. No.: 858,545

[22] Filed: Mar. 27, 1992

Related U.S. Application Data

[63] Continuation-in-part of Ser. No. 643,950, Jan. 22, 1991, abandoned.

[51] Int. Cl.⁵ .............................................. B29C 63/42
[52] U.S. Cl. ................................. 264/229; 264/269; 264/280; 264/285; 264/295; 405/174
[58] Field of Search .................. 156/293, 294; 138/97; 29/234; 405/154, 174, 177; 264/229, 230, 269, 280, 285, 295, 339, 516

[56] References Cited

U.S. PATENT DOCUMENTS

| | | | |
|---|---|---|---|
| 3,720,070 | 3/1973 | Raves | 405/177 |
| 4,504,171 | 3/1985 | Florence | 405/154 |
| 4,923,663 | 5/1990 | McMillan | 264/229 |
| 5,114,634 | 5/1992 | McMillan et al. | 156/294 |

FOREIGN PATENT DOCUMENTS

| | | |
|---|---|---|
| 1241262 | 8/1988 | Canada . |
| 3519439 | 12/1985 | Fed. Rep. of Germany . |
| 4984 | 1/1987 | Japan . |
| 649657 | 5/1985 | Switzerland ................. 405/154 |
| 808584 | 2/1981 | U.S.S.R. . |
| 2084686 | 4/1982 | United Kingdom . |
| 2227543 | 8/1990 | United Kingdom ............ 138/97 |

*Primary Examiner*—Michael W. Ball
*Assistant Examiner*—Steven D. Maki
*Attorney, Agent, or Firm*—Charles D. Gunter, Jr.

[57] ABSTRACT

A method and apparatus are shown for lining a tubular member with an elastomeric liner having an outside diameter which is initially greater than the inside diameter of the tubular member. A series of downsizing rollers reduce the outside diameter of the liner a preselected amount. A series of shaping rollers form the downsized liner into an ellipse, thereby allowing the downsized liner to be guided around bends and turns into the interior of the tubular member. After insertion, the liner is allowed to expand to substantially its original outside diameter to secure the liner within the tubular member.

15 Claims, 6 Drawing Sheets

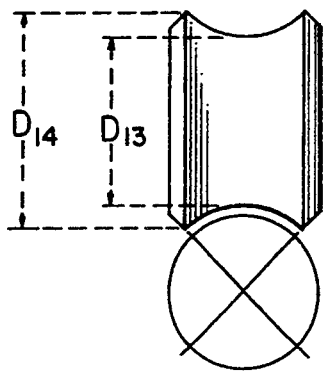
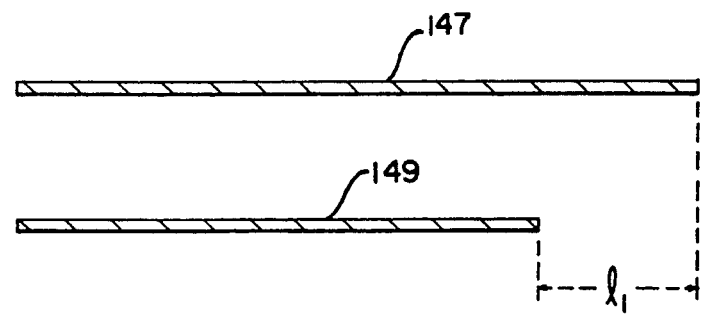
FIG. 17a
FIG. 17b
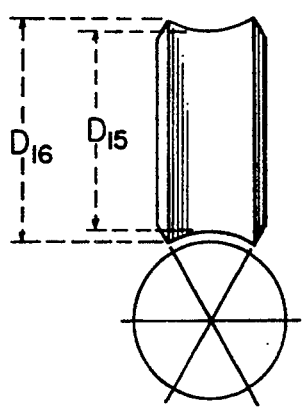
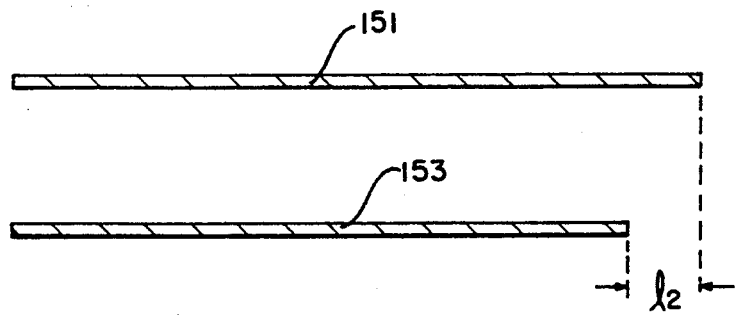
FIG. 18a
FIG. 18b

VARIABLE ANGULAR INSERTION METHOD FOR LINING TUBULAR MEMBERS

CROSS REFERENCE TO RELATED APPLICATIONS

This application is a continuation-in-part of our earlier filed application, Ser. No. 07/643,950, filed Jan. 22, 1991, now abandoned, entitled "ANGULAR INSERTION METHOD FOR LINING TUBULAR MEMBERS."

BACKGROUND OF THE INVENTION

1. Field of the Invention

The present invention relates generally to a method for lining a tubular member, such as a chemical pipeline, with a synthetic liner, the liner being fed along a variable angular path to the interior of the pipe to be lined and being secured within the pipe interior without the necessity of heat, vacuum or chemical bonding agents.

2. Description of the Prior Art

Fluid carrying pipes are often subject to deterioration, corrosion and other conditions which are detrimental to the life of the pipe or to the fluids moving through the pipe. This problem is particularly acute in many chemical process industries where caustic chemicals are being transported through pipelines. Modern chemical plants often include miles of pipeline subject to corrosion and deterioration. The pipelines needing lining may be buried below ground, elevated above ground, or be in storage racks.

Other chemical pipelines which are encompassed by the present invention include sewer pipes, water mains or gas mains, where foreign agents such as plant roots often break through the pipe wall and intrude into the pipe interior, thereby destroying the integrity of the pipe. Other factors such as differential pressures internally and externally of the pipe, erosion or earth movements can form leaks in the pipework which must be repaired. If excavating, uncoupling, replacing and backfilling of the pipework is required, the process is usually time consuming and expensive. An alternative solution is to provide an internal lining to the pipework to remedy leakage problems.

Although plastic inserts have been used in the past for protective purposes, their use has generally involved cumbersome and difficult procedures for effectively installing such liners, and particularly in sealing them to the wall of the pipe.

U.S. Pat. No. 3,494,813, to Lawrence et al., issued Feb. 10, 1970, shows a method for installing a plastic liner in a pipe by using vacuum to draw the liner into the pipe and to assure tight sealing engagement between the liner and the pipe wall.

U.S. Pat. No. 1,708,141, to Kepler, issued Apr. 9, 1929, shows a method of lining a pipe with an elastomeric lining in which the lining is pushed through a reducing die and coated with cement.

U.S. Pat. No. 3,462,825, to Pope et al., issued Aug. 26, 1969, shows a method for lining a tubular member with a fluorocarbon liner having an initial outside diameter greater than the inside diameter of the tubular member. The liner is placed in the tubular member by gripping one end of the liner and pulling it through a reducing die and into the tubular member. The liner is then released, allowing it to expand into engagement with the inner wall of the tubular member.

British application, GB 2084686, filed Sep. 25, 1990, shows a method for lining sewer pipes in which a liner is pushed through downsizing rollers and fed into the pipe with heat being used to cause reverse expansion of the liner. Since the liner is fed approximately linearly into the underground pipe, it was necessary to excavate a sizeable opening in the surface of the ground for feeding the liner into the pipe interior.

None of the above methods succeed in providing an improved method for lining a tubular member with a synthetic liner in which the primary mechanism for securing the liner within the tubular member is the radial pressure exerted on the tubular member by the synthetic liner, the liner being in a state of circumferential compression within the surrounding tubular member when installed.

None of the above methods provides a convenient method for installing a liner in a tubular member wherein the liner is fed in a variable angular path toward the tubular member to be lined to thereby facilitate the lining of tubular members which are located below ground, or at various elevations above ground.

A need exists, therefore for a method for lining chemical or other pipelines in which the liner is installed without the use of chemical bonding agents and without the use of heat or vacuum pressure.

A need also exists for a method for lining an underground pipe which requires minimum excavation of the ground surface surrounding the point of liner insertion into the interior of the pipe.

A need also exists for a method for lining chemical or other pipelines which allows the liner to be guided through a variety of angular orientations toward the interior of the pipeline to be lined.

SUMMARY OF THE INVENTION

In the method of the invention, a tubular member is lined with a generally cylindrical, elastomeric liner having an outside diameter which is initially greater than the inside diameter of the tubular member. A length of the generally cylindrical liner is first reduced to a downsized outside diameter by feeding a length of the liner to a set of downsizing rollers. The length of downsized, generally cylindrical liner which exits the downsizing rollers is passed through a set of shaping rollers which reform the external configuration of the liner to a shape particularly adapted for variable angular bends. Preferably, the shaping rollers provide the liner with an elliptical shape. The elliptically shaped liner is then fed through one or more sets of orienting rollers which guide the liner toward the mouth of the tubular member to be lined.

In the case of an underground tubular member, such as a sewer pipe, the elliptically shaped liner is fed through a first set of orienting rollers which guide the elliptically shaped liner through a first 90° turn. The elliptically shaped liner is then fed through a second set of orienting rollers which guide the elliptically shaped liner through a second 90° turn, whereby the length of elliptically shaped liner exiting the second set of orienting rollers is oriented in a plane generally parallel to the surface of the ground and aligned with the open interior of the underground tubular member to be lined. The elliptically shaped liner is then passed through a set of reshaping rollers which return the length of liner to a generally cylindrical, downsized external diameter. The downsized liner is then inserted into the tubular member to be lined and is allowed to expand to substantially its original outside diameter to thereby secure the liner within the tubular member.

By varying the angular orientation of the elliptically shaped liner exiting the orienting rollers, the liner can be fed toward above ground pipes which are located at various elevations, including pipe mounted in structural storage racks.

Additional objects, features, and advantages will be apparent in the written description which follows.

BRIEF DESCRIPTION OF THE DRAWINGS

FIG. 17a is a schematic view of an eight inch pipe with a four roller system illustrating the roller root diameter and edge diameter;

FIG. 17b is a schematic illustration comparing the differential distance travelled by points on the root and edge surfaces of the roller of FIG. 17a;

FIG. 18a is a view similar to view 17a for an eight inch pipe a six roller system; and FIG. 18b is a view similar to FIG. 17b showing the decrease in differential distance due to the use of a greater number of rollers.

DETAILED DESCRIPTION OF THE INVENTION

Figure 1:
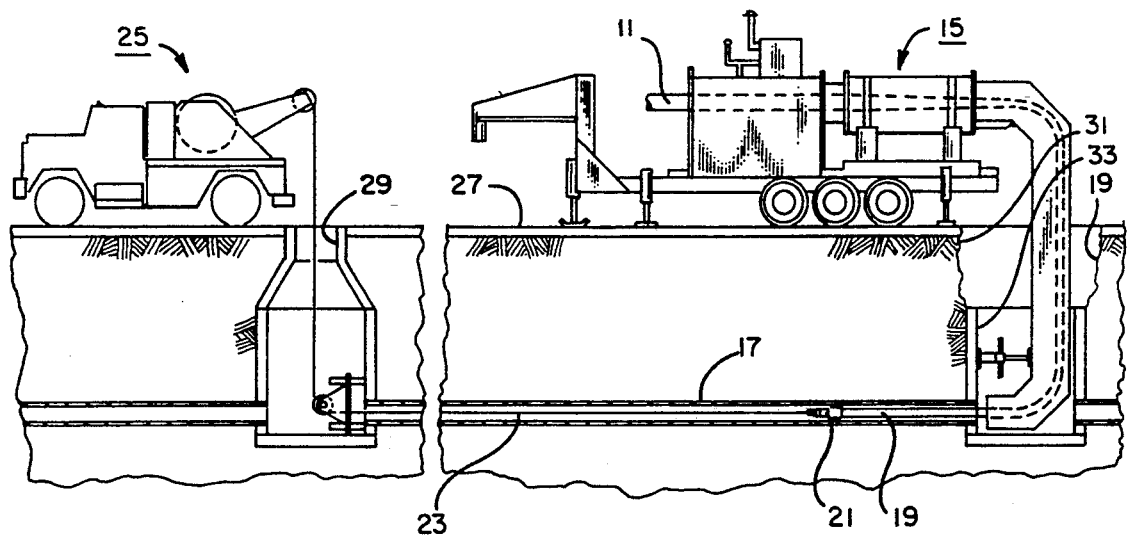
FIG. 1 is a simplified, schematic view illustrating the variable angular insertion of a liner into a tubular member using the method of the invention.

FIG. 1 is a simplified, schematic view of the steps and apparatus used in the method of the invention. A length of elastomeric liner 11 is fed from a pre-welded supply (not shown) through the insertion apparatus 15 to the tubular member 17 to be lined. The surface of the ground (27 in FIGS. 1 and 5) defines a horizontal support surface for the insertion apparatus 15. The tubular member 17 can be, for instance, a cylindrical conduit such as a sewer pipe, water main, gas main or chemical process line which extends in the ground 18. In this case, the tubular member 17 is located below the surface of the ground 27 in a horizontal plane which is approximately parallel to the ground surface 27. As will be apparent in the description which follows, the method can be used to line an above ground pipe as well, such as a fluid transport pipeline in a chemical plant or joints of pipe stored at an elevated location in a storage rack.

The elastomeric liner 11 can be any synthetic elastomer which initially has an outside diameter greater than the inside diameter of the tubular member 17 and which can be downsized and returned to substantially its original outside diameter according to the method of the invention. Preferred liner materials include polyolefin materials, with the preferred material being commercially available polyethylene pipe. It is preferred that the polyethylene pipe be of about 3% to 5% greater initial outside diameter than the tubular member to be lined. An increase in initial outside diameter of the liner increases the force necessary to downsize the liner. As a result, a liner having only slightly greater outside diameter than the tubular member 17 to be lined is preferred. The wall thickness of the liner is not critical, so long as it is great enough to permit the liner to be downsized without distortion or irregular deflection of the liner material.

In the embodiment of the invention shown in FIG. 1, the liner 11 has a leading end 19 with a pulling head 21 secured thereto, the pulling head 21 being attached to a cable 23 which runs to a pulling unit 25 located at the surface of the ground 27. The pulling unit 25 is located adjacent a manhole opening 29 which provides access to the sewer pipe 17. The insertion unit 15 is located adjacent an insertion opening 31 which has been formed by excavating a manhole opening 33 along a generally vertical axis with respect to the surface of the ground 27.

Figures 2, 3:
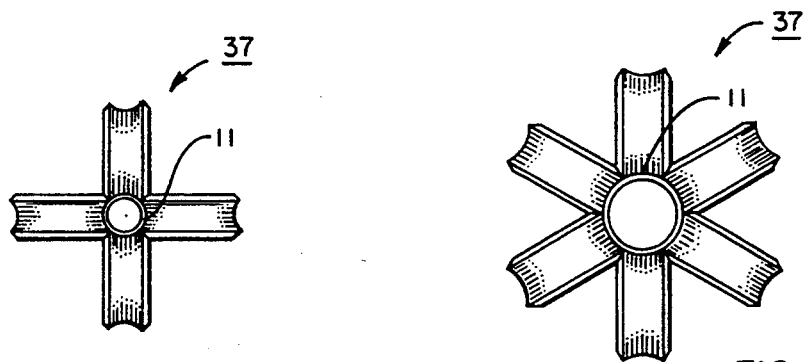
FIGS. 2–4 are isolated, schematic views illustrating various arrangements of downsizing rollers used in practicing the method of the invention.
Figure 4:
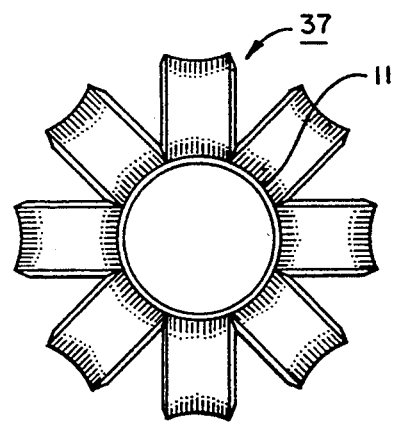
Figure 5:
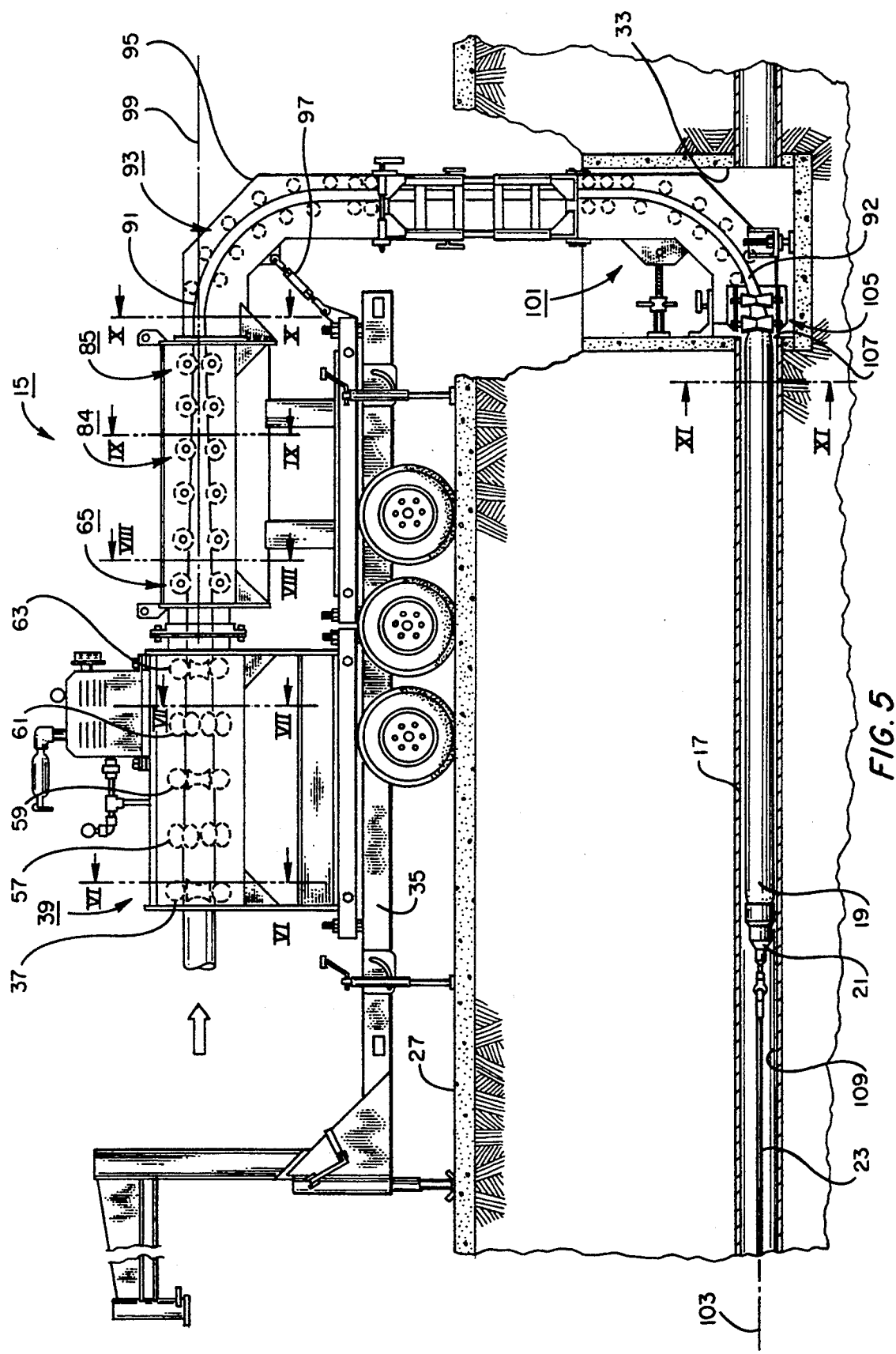
FIG. 5 is an enlarged view, partially in section, of the insertion apparatus used in practicing the method of the invention.

FIG. 5 shows the insertion apparatus in greater detail. The insertion apparatus 15 includes a platform trailer 35 having means provided thereon for reducing a length of the generally cylindrical liner 11 to a downsized outside diameter by feeding the length of liner 11 in a horizontal plane along a horizontal axis (99 in FIG. 5) which generally parallels the surface of the ground 27. Preferably, the downsizing means includes one or more sets of downsizing rollers 37 at a rolling station 39. In the preferred embodiment to be further described below, each set of downsizing rollers 37 includes four rollers offset at 90° increments. However, as shown in FIGS. 3 and 4, the number of rollers present in each downsizing set can vary, depending upon the diameter of the pipe being downsized. Each set of downsizing rollers (e.g. set 37 in FIG. 4) includes a central opening with a central axis 38 which is approximately co-incident with the horizontal axis 99 and which axis defines a first path of travel for the cylindrical liner.

Figure 6:
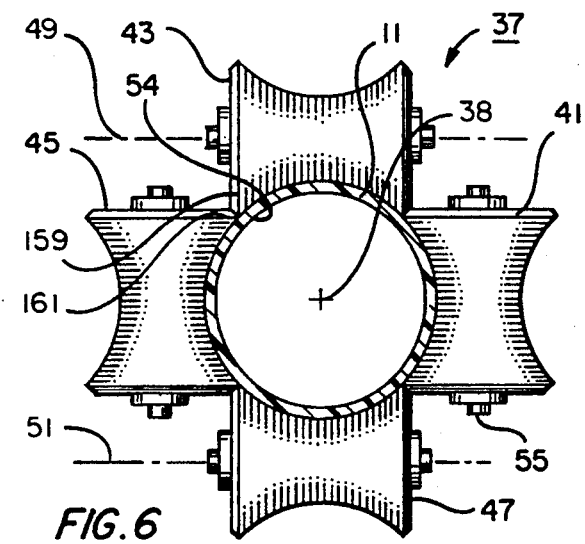
FIG. 6 is an isolated view of the downsizing rollers, taken along lines VI—VI in FIG. 5.

FIG. 6 shows the first set of downsizing rollers 37 present in the insertion apparatus of FIG. 5 in isolated fashion for ease of illustration. In the embodiment of FIG. 6, the downsizing roller set 37 includes four hemispherical rollers 41, 43, 45, 47 which are offset at equal increments (in this case 90°) about the exterior of the liner 11. Each of the downsizing rollers present in a given set of rollers has an axis of rotation (e.g., axes 49, 51 in FIG. 6) with the axes of opposing pairs of rollers in each set being separate and parallel. As shown in FIG. 6, the rollers in the set 37 define a 360° region of contact with the exterior of the liner 11 being fed through the liner receiving opening. Each hemispherical roller 41 is rotatable about a shaft 55 mounted on the frame of the rolling station 39 by a suitable flange.

Preferably, at least one of the downsizing roller sets 37 is driven by means of a drive motor 40 provided on the frame of the insertion apparatus 15. The drive motor 40 can be selectively engaged to drive downsizing rollers 37 whereby the roller sets 37 frictionally engage and power the liner 11 in a forward direction (to the right along horizontal axis 99 in FIG. 5) to thereby advance liner 11 through the insertion unit. It may be desirable to advance liner 11 by driving downsizing rollers 37 for long lengths of liner 11. Additionally, when installation is such that pulling unit 25 cannot be utilized, liner 11 is then advanced by driving downsizing rollers 37. Generally, only the last set of downsizing rollers, such as rollers 63, or rollers 63 and 61 will be driven. These rollers may be driven alone or in combination with pulling unit 25 to push and pull liner 11 forward through insertion unit 15.

As mentioned above and as illustrated in FIGS. 2–4, the number of downsizing rollers in each roller set can vary, depending upon the outside diameter of the liner being handled. Each set of downsizing rollers has a number of rollers, the liner is one liner or another liner, the outside diameter of the one liner is greater than the outside diameter of the another liner end the number of downsizing rollers provided for the one liner is greater than the number of rollers provided for the another liner. Generally, as the diameter of the pipe being rolled increases, the number of rollers spaced around the pipe outer diameter must also increase to produce a linear elongation in the liner whereby the liner maintains a standard dimensional ratio in the downsized condition and distortion of the liner is minimized or eliminated. For four inch polyethylene pipe (FIG. 2), a four roller system has proved satisfactory. For an eight inch pipe (FIG. 3), a six roller system has been used advantageously. For a sixteen inch pipe (FIG. 4), an eight roller system has proved satisfactory.

The criteria for determining the optimum number of rollers, based on pipe diameter can be explained as follows. The work necessary to impose temporary or permanent strain in a thermoplastic material varies with the type of plastic and its viscoelasticity. Thus, while the preferred invention will be described with respect to high density polyethylene (HDPE), it will be understood that any thermoplastic material might be used. The work necessary to impose temporary and/or permanent strain is affected by the total percent reduction of the pipe to be attained, the percent reduction at each roller set, the number of roller sets, the separation between roller sets to allow for elastic recovery before further working (reduction), the root diameter of the roller versus the pipe diameter ratio (which prescribes the residence time), and the linear velocity at which the liner passes through the roller sets (which determines residence time and viscoelastic response).

Figure 15A:
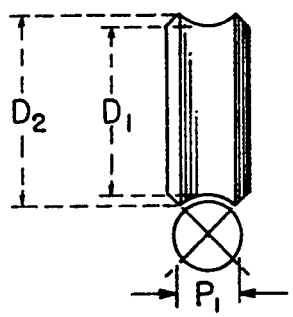
FIG. 15a is a schematic view comparing roller root diameter to roller edge diameter for a four inch pipe in a four roller system.

In the present invention, the rate of work imposed is limited to the rate at which the material will accept the elastic and viscoelastic strain without damage to the molecular structure and the intermolecular order of the liner material. With reference to FIG. 15c, the interfacial contact points between the roller and pipe form parabola-like curved surfaces (143, 145 respectively). The roller root diameter ($D_1$ in FIG. 15a) the roller outer edge diameter ($D_2$), the number of rollers and the ratio of the roller root diameter ($D_1$) to the pipe diameter ($P_1$ in FIG. 15a) define a residence contact time within each roller set at a fixed velocity. These factors also define a surface shearing tangential to the liner pipe circumference at the outer edge of each roller and thus the number of focused "wall-compression" zones within a roller set, and the location of multiple "wall-compression" zones between multiple roller sets. To limit surface shearing damage, the roller root diameter ($D_1$) to roller edge diameter ($D_2$) ratio should in all cases exceed about 50%, and while about 60–67% ratios have been utilized, the preferred embodiment for the present invention is at least about an 87% ratio for HDPE. As will be explained, this percentage is regulated by the number of rollers within a set and by the ratio of the roller root diameter to the liner pipe diameter.

Referring again to FIGS. 15a–15c, FIG. 15a shows a four inch pipe liner within a four roller system, one of the rollers being shown for ease of illustration. $D_1$ is 8.828 inches while $D_2$ is 10.0 inches. The ratio of $D_1:D_2$ is 88.28%. This is within the acceptable range for the present invention.

Figure 15B:
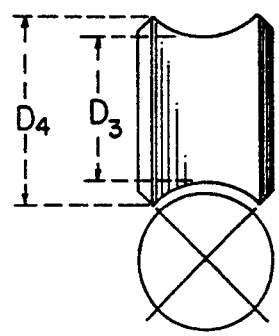
FIG. 15b is a schematic view comparing roller root diameter to roller edge diameter for an eight inch pipe in a four roller system.
Figure 15C:
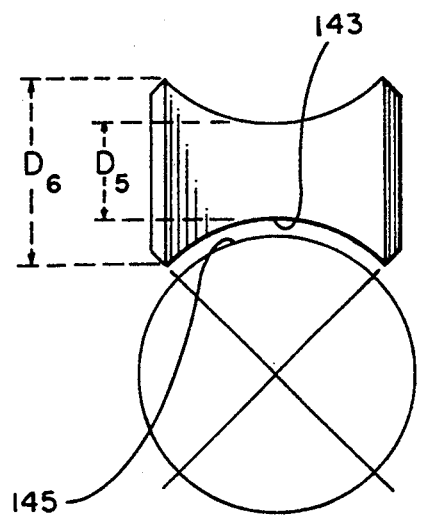
FIG. 15c is a view similar to FIG. 15b for a sixteen inch pipe in a four roller system.

FIG. 15b shows an eight inch pipe with a four roller system, one roller being shown for ease of illustration. $D_1$ is 7.657 inches while $D_2$ is 10.2 inches. The ratio of $D_1:D_2$ is 76.57%, outside the preferred range.

FIG. 15c shows that as pipe diameter increases the situation becomes less desirable. FIG. 15c shows a sixteen inch pipe with a four roller system. $D_1$ is 5.314 inches while $D_2$ is 10.2 inches. The ratio of $D_1:D_2$ is 53.14%, well outside the preferred operating range for purposes of the present invention.

Figure 16A:
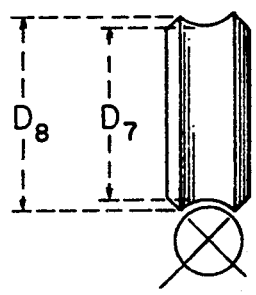
FIG. 16a is a view similar to FIG. 15a for a four inch pipe in a four roller system.
Figure 16B:
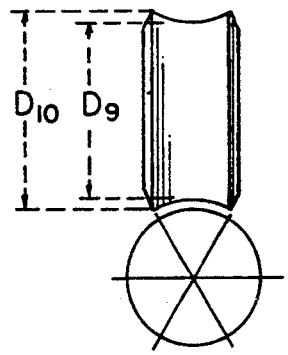
FIG. 16b is a view similar to FIG. 15b for an eight inch pipe in a six roller system.
Figure 16C:
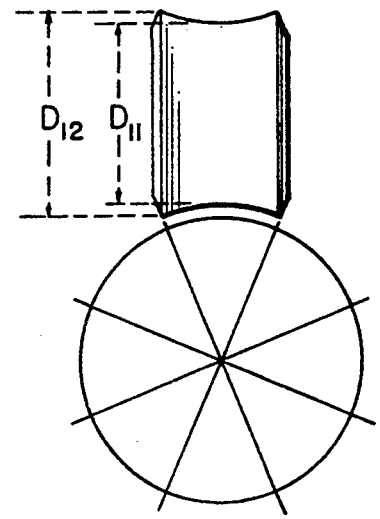
FIG. 16c is a view similar to FIG. 15c for a sixteen inch pipe in an eight roller system.

FIGS. 16a–16c show how the above described problem can be corrected. FIG. 16a shows a four inch pipe with a four roller system. $D_1$ is 8.828 inches while $D_2$ is 10.0 inches. The ratio of $D_1:D_2$ is 88.28%. FIG. 16b shows an eight inch pipe with a six roller system. $D_1$ is 8.928 inches while $D_2$ is 10.0 inches. The ratio of $D_1:D_2$ is 89.28%. FIG. 16c shows a sixteen inch pipe with an eight roller system. $D_1$ is 8.782 inches while $D_2$ is 10.0 inches. The ratio of $D_1:D_2$ is 87.82%. Each of the above differentials is within the preferred range of the present invention.

The same principle can also be explained with reference to FIGS. 17a–18b. FIG. 17a shows an eight inch pipe with a four roller system. $D_{13}$ is 7.657 inches while $D_{14}$ is 10.0 inches. Line 147 illustrates points located on the ten inch edge diameter of the roller while line 149 illustrates points located on the 7.657 inch root diameter of the roller each length being multiplied times 3.14. Line 147 thus represents a 31.4 inch circumference while line 149 represents a 24.043 inch circumference. The differential distance $l_f$ is 7.357 inches which must generally be accommodated by either slippage or elongation and stretching of the pipe liner.

FIG. 18a shows an eight inch pipe with a six roller system. $D_{15}$ is 8.928 inches while $D_{16}$ is 10.0 inches. Line 151 represents points on the roller outer edge diameter multiplied times 3.14 to give a 31.4 inch circumference. Line 153 represents points on the 8.928 inch root diameter multiplied times 3.14 to give a 28.034 inch circumference. The differential distance between the lines is 3.366 inches, well below the 7.357 inch differential of FIG. 17b. The decreased differential distance helps to prevent slippage or elongation of the liner.

As shown in FIG. 5, each additional downsizing roller set 57, 59, 61 and 63 is also mounted in the rolling station along the first path of travel with the midpoint 38 of each liner receiving opening being located along and approximately co-incident with the horizontal axis 99. Each of the roller sets is identical in construction and arrangement to that of the first roller set 37 shown in FIG. 4. However, each of the roller sets is machined to provide a progressively smaller liner receiving opening. For instance, in the embodiment shown in FIG. 5, the first roller set 37 provides a 2% reduction in the original outside diameter of the liner 11 with the roller set 59 providing a 4% reduction and the roller set 63 providing a 6% reduction in the original outside diameter of the liner 11. The progressive downsizing of the liner is illustrated in simplified fashion in FIGS. 6 and 7. It will be understood that various degrees or percentages of downsizing may be required.

In addition to selecting the proper roller root diameter and outer edge diameter and number of rollers in each roller set, it is also necessary to provide an angular rotation between roller sets where multiple sets of rollers are utilized. For example, referring to FIGS. 6 and 7, the downsizing roller set 61 is rotated 45° about the horizontal axis defined by the midpoint 38 from the position of roller set 37. In this way, the potential for concentrated macro-crushing in local wall compression zones is minimized and a more uniform strain is provided for energy input to the system. By providing proper angular rotation between roller sets, the number of focused wall compression zones is maximized and uniformly distributed over the pipe circumference. For example, a 10% compression distributed over four $22\frac{1}{2}°$ arcs at the roller edge contact points (155, 157 in FIG. 7) equates to a 10% macro-compression over a 90° arc, or about 40% compression in each $22\frac{1}{2}°$ segment. This focused wall compression within the localized wall compression zones should remain within the material's viscoelastic compressive strain capability. This is governed by the percent reduction at each roller set, the number of roller sets and the number of rollers within each set, as well as by the angular rotation of the roller sets. The angular rotation is used to establish multiple focused wall compression zones circumferentially about the pipe liner exterior such that no single zone gets worked beyond its compressive strain capacity and such that the zones are evenly distributed about the pipe liner circumference so that no single focused wall compression zone is worked twice, thereby exceeding the materials' compressive strain limit.

Figure 7:
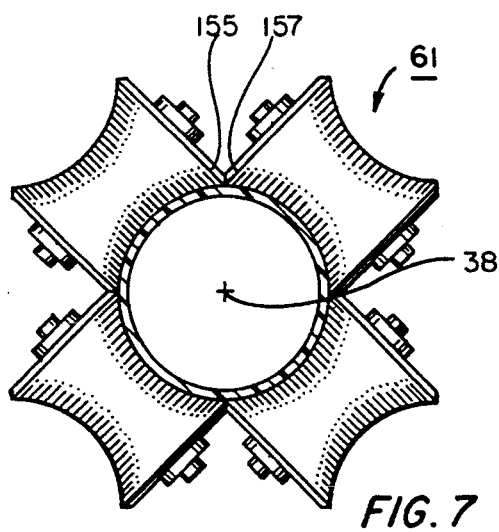
FIG. 7 is an isolated view of the downsizing rollers, taken along lines VII—VII in FIG. 5.

Note how the high stress points defined by the roller edge contact points (155, 157) in FIG. 7 have moved about the circumference of the liner from the position of the high stress points 159, 161 in FIG. 6.

As a practical matter, the degree of angular rotation can be determined by dividing 360° by the number of rollers in the roller set. Thus, for a five roller set, the degrees of rotation of the rollers in the set would be 0°, 18°, 36°, 54°, 72°, respectively.

Figure 8:
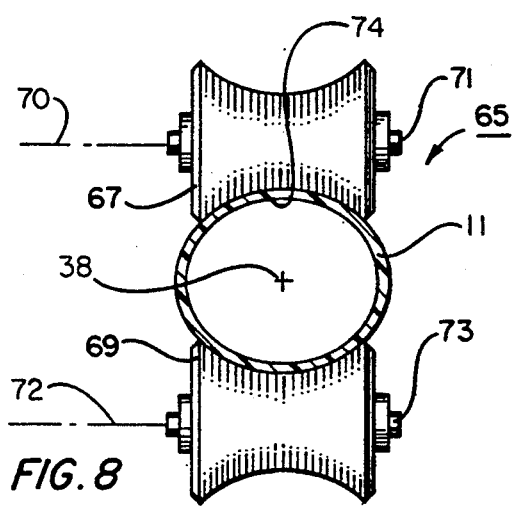
FIG. 8 is an isolated view of the downsizing rollers, taken along lines VIII—VIII in FIG. 5.
Figure 10:
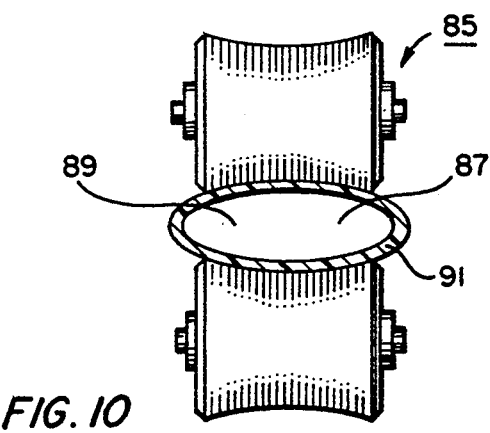
FIG. 10 is an isolated view of the downsizing rollers, taken along lines X—X in FIG. 5.

After being downsized, but while still travelling along the first path of travel defined by horizontal axis 99, the liner 11 next passes through a forming means, such as shaping rollers 65. The shaping rollers 65 provide the liner 11 with an external configuration adapted to the passed around variable angular bends or corners in the insertion path. As shown in FIG. 8, each set of shaping rollers 65 preferably includes at least first and second shaping rollers 67, 69 mounted on shafts 71, 73 on opposite sides of the liner 11. The shafts 71, 73 of the shaping rollers 67, 69 are located in parallel planes and define axes of rotation 70, 72 which are separate and parallel. The roller contact surfaces (74 in FIG. 8) define a partial region of contact with the liner being fed through the liner receiving opening. Preferably, the shaping rollers 67, 69 provide the liner 11 with an elliptical shape. By "elliptical" is meant that the ultimate shape of the liner 11 exiting the last set of shaping rollers 85 is defined by the path of a point that moves so that the sum of its distances from two fixed points called foci (87, 89 in FIG. 10) is constant. The shape is also the same as that defined by the closed curve produced when a cone is cut by a plane inclined obliquely to the axis and not touching the base.

After being reshaped by the shaping rollers, the elliptically shaped liner 91 (FIG. 10) exits the shaping rollers and is then fed through an orienting means, such as the first set of orienting rollers 93. The orienting rollers guide the elliptically shaped liner 91 along a second path of travel, the second path of travel being along a different axis from the first path of travel defined by the axis 99. This second path of travel will generally be at an angle ranging from about 10° to 90° from the path of travel of the axis 99. In the example illustrated in FIG. 5, the first set of orienting rollers 93 guide the liner 91 through a first 90° turn whereby the liner assumes a direction of travel which is approximately perpendicular to the first path of travel defined by horizontal axis 99. The orienting rollers 93 are rotatably mounted within a frame or track 95 which is supported on the rear of the platform trailer 35 and which is extendible by means of a hydraulic cylinder 97 between the vertical position shown in FIG. 5 and a generally horizontal, transport position. The orienting rollers are not generally powered by a drive means, as are the downsizing rollers 37.

Figure 9:
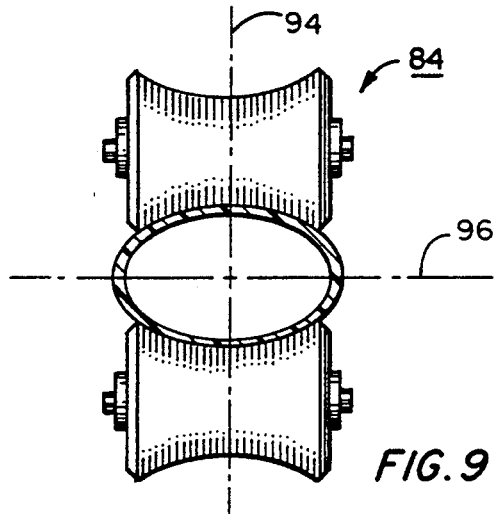
FIG. 9 is an isolated view of the downsizing rollers, taken along lines IX—IX in FIG. 5.

Note that, as shown in FIG. 9, the liner 11 is reshaped to have what will be referred to as a "short" or minor axis 94 and a "long" or major axis 96, as the liner turns in a direction other than along the first path of travel defined by axis 99, it bends or curves about the major axis 96.

The elliptically shaped liner 91 is then fed through a second set of orienting rollers 101 which guide the elliptically shaped liner through a second 90° turn, whereby the length of elliptically shaped liner 92 exiting the second set of orienting rollers is again oriented along a horizontal axis 103 which is generally parallel to the horizontal axis 99 defining the first path of travel and to the surface of the ground 27.

Figure 11:
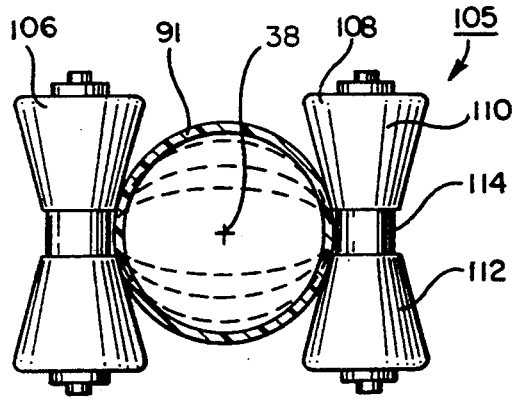
FIG. 11 is an isolated view of the downsizing rollers, taken along lines XI—XI in FIG. 5.

The elliptically shaped liner 91 is then passed through reshaping means, including the set of reshaping rollers 105 (FIG. 11) located within the manhole opening 33 adjacent the opening 107 into the interior 109 of the sewer pipe 17 to be lined. Each reshaping roller set 105 making up the reshaping means is preferably made up of two reshaping rollers 106, 108 (FIG. 11) which are rotated 45° about the midpoint 38 from the position of the last set of shaping rollers (85 in FIG. 10). Each reshaping roller 106, 108 is made up of oppositely extending frusto conical portions 110, 112 which are joined at a cylindrical mid region 114. The reshaping rollers 105 are oriented to provide the length of liner 111 exiting the reshaping rollers 105 with a generally cylindrical, downsized external diameter which is approximately the same as the shape of the liner 11 exiting the downsizing roller sets 37. FIG. 11 shows the length of liner 91 regaining its cylindrical shape.

Figure 12:
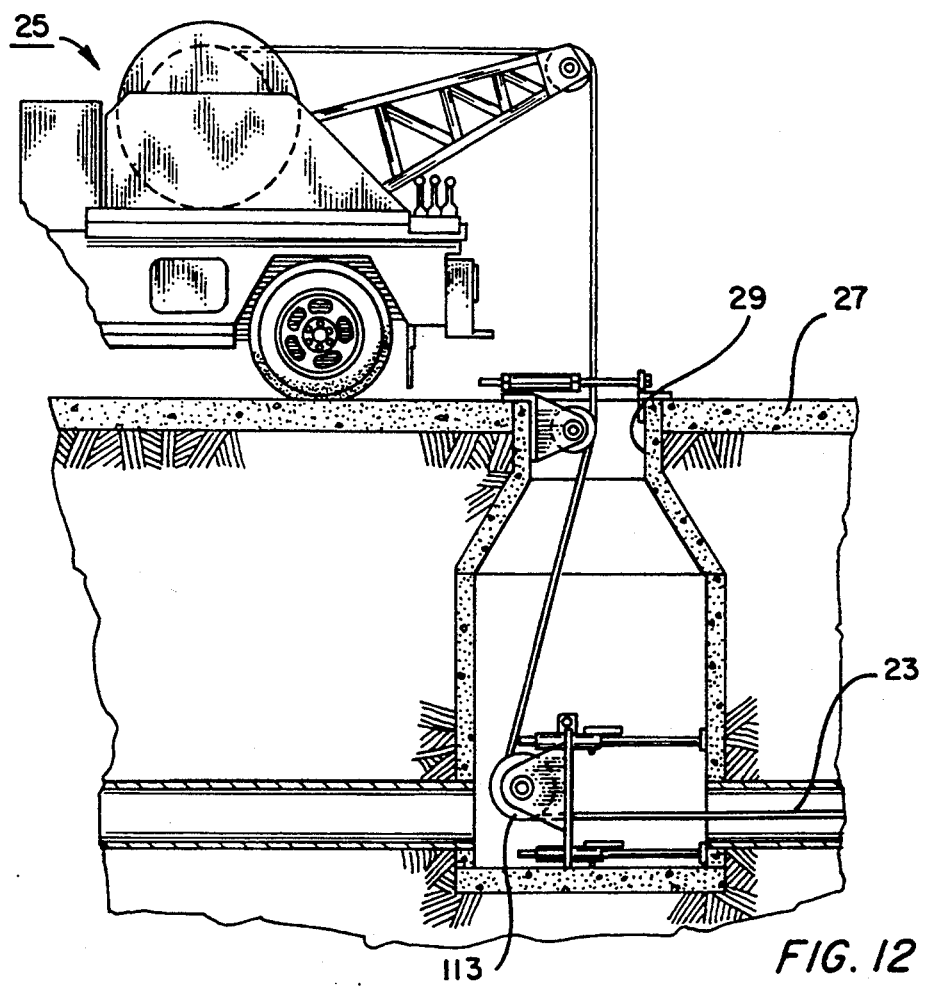
FIG. 12 is an enlarged, partial sectional view of a pulling apparatus used in the method of the invention.

The generally cylindrical, downsized liner is inserted within the sewer pipe 13 and pulled with the pulling head 21 and cable 23, the cable 23 being passed around a sheave 113 (FIG. 12) to the pulling unit 25 located adjacent the first manhole opening 29 at the surface of the ground. After pulling the leading end 19 of the liner through the interior 109 of the sewer pipe 17, the downsized liner is allowed to expand to substantially its original outside diameter to thereby secure the liner within the tubular member 17.

Figure 13:
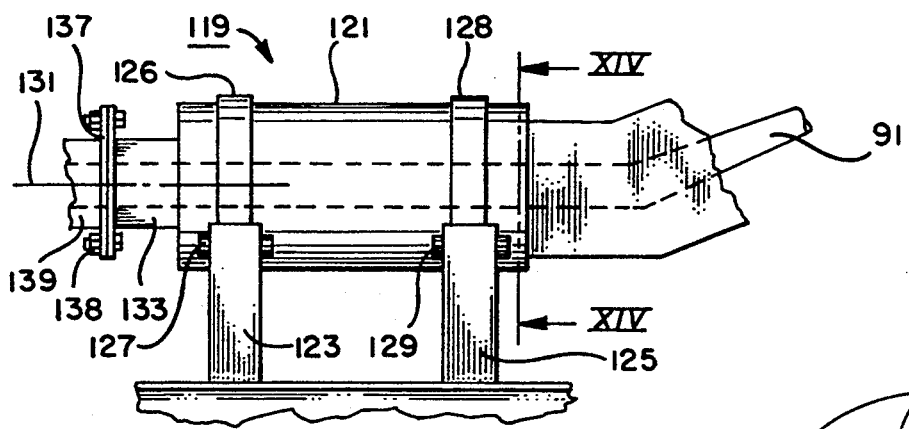
FIG. 13 is an isolated view of the rotatable carriage which houses the shaping rollers used in the method of the invention.
Figure 14:
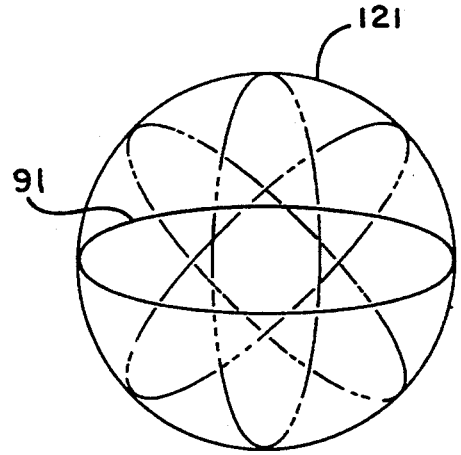
FIG. 14 is a simplified end view of the rotatable carriage, taken along lines XIV—XIV in FIG. 13 illustrating the various angular orientations which are possible for the elliptically shaped liner which is exiting the rotatable carriage.

As shown in FIG. 13, the forming means of insertion apparatus 15 is preferably provided as a rotatable carriage 119. The rotatable carriage 119 includes a cylindrical housing 121 which contains the shaping rollers 65. The cylindrical housing 121 is mounted on support posts 123, 125 having yokes 126, 128 and roller means 127, 129 for allowing rotation of the housing about horizontal axis 131. The housing 121 has a leading end 133 which includes a flange 135. Flange 135 can be engaged, as by bolts 138, with a mating flange 137 of the stationary, trailing end 139 of the rolling station 39. Removing the bolts 138 allows the housing 121 to be rotated through, for instance, 30° increments before again being bolted to the stationary flange 137. In this way, the elliptically shaped liner 91 exiting the rotatable carriage can be fed through a variety of angular insertion paths (illustrated by dotted lines in FIG. 14) toward, for instance, an above ground pipeline or a joint of pipe located within an elevated storage rack.

Preferably, the synthetic elastomer selected for use as the liner 11 has known reverse expansion characteristics. The degree of elongation which is effected by passing the liner through the downsizing rollers 41, 43, 45, 47 is calculated to allow insertion of the liner within the tubular member 17. Reverse expansion of the liner 11 serves to tightly engage the liner within the internal diameter of the tubular member.

As an example of the present method, a sewer pipe having an inside diameter of 7⅜ inches was lined according to the method of the invention. The liner was a polyethylene pipe having an initial outside diameter of eight inches with a wall thickness of 0.246 inches. The percentage reduction in outside diameter of the liner is shown in Table I as it passed through the sets of reducing rollers.

TABLE I

| | 8.00 inch polyethylene liner (all dimensions in inches) | | | |
|---|---|---|---|---|
| | roller set 37 | roller set 57 | roller set 61 | roller set 63 |
| o.d | 7.840 | 7.680 | 7.520 | 7.360 |
| % reduction | 2% | 4% | 6% | 8% |

The reduced liner 11 will attempt to return to its approximate original outside dimensions until it comes into contact with the internal diameter of the host pipe, at which time the liner will be securely engaged within the interior of the pipe 17 without the necessity of heating or the use of chemical bonding agents.

An invention has been provided with several advantages. Because the reverse expansion characteristics or "memory" of the liner 11 are known, the liner returns to a pre-determined size to fill out and conform to the internal diameter of the tubular member 17 without the use of heat or chemical bonding agents. The use of shaping rollers to first provide the initially cylindrical liner with a generally elliptical shape has been found to facilitate angular insertion, including 90° turns in the path of the liner being fed to the tubular member to be lined. By properly arranging and sizing the downsizing roller set, the standard dimensional ratio of the liner can be maintained in the downsized condition so that a more linear elongation of the liner is achieved. Because a nearly perfect linear expansion of the liner results, a more uniform contact can be achieved within the internal diameter of the tubular member as the liner reversely expands free from any mechanically induced stress. Because the liner can be fed through various angular orientations on its path toward the opening of the tubular member to be lined, both above and below ground pipes can be lined with a minimum of effort. In the case of sewer pipes, the amount of excavation required at the manhole opening is minimized, thereby saving time and minimizing the disruption of the ground surface.

While the invention has been shown in only one of its forms, it is not thus limited but is susceptible to various changes and modifications without departing from the spirit thereof.

We claim:

1. A method of lining a tubular member with a generally cylindrical, elastomeric liner having an outside diameter which is adapted to be received within the inside diameter of the tubular member, the elastomeric liner having a central opening with a midpoint located on a central axis thereof, the method comprising the steps of:

feeding a length of the liner along a first axis which defines a first path of travel, the midpoint of the elastomeric liner being located on the first axis;

shaping the liner from a generally cylindrical shape into an elliptical shape by passing the length of generally cylindrical liner through a set of shaping rollers having a liner receiving opening between the rollers with a midpoint of the liner receiving opening located on the first axis which defines the first path of travel, after shaping the liner into an elliptical shape with the shaping rollers, passing the elliptically shaped liner along the first axis and then feeding the elliptically shaped liner through an orienting means which turns the elliptically shaped liner and guides the elliptically shaped liner along a second path of travel, wherein the second path of travel is oriented along a different axle from the axis of the first path of travel;

thereafter, passing the elliptically shaped liner through a set of reshaping rollers to reshape the elliptically shaped liner into a generally cylindrical shape; and inserting the reshaped liner into the tubular member to be lined.

2. A method of lining a tubular member with a generally cylindrical, elastomeric liner having an outside diameter which is initially greater than the inside diameter of the tubular member, the method comprising the steps of:

reducing a length of the generally cylindrical liner to a downsized outside diameter by feeling a length of the liner through multiple sets of downsizing rollers, each set of downsizing rollers having a liner receiving opening between the downsizing rollers with a midpoint of the liner receiving opening being located on a first axis which defines a firm path of travel for the liner, each set of downsizing rollers being arranged about the elastomer liner to compress the liner at focussed wall compression zones and progressively downsize the liner, wherein each roller of one set of downsizing rollers has an axis of rotation and is positioned about the first axis so that its axis of rotation is at an angularly rotated position about the first axis relative to an axis of rotation of each roller of a preceding set of downsizing rollers to thereby maximize the number of focused wall compression zones and more uniformly distribute stress over the liner circumference, wherein the reducing step effects a linear elongation of the liner and the liner retains a standard dimensional ratio in the downsized condition;

shaping the liner from a generally cylindrical shape into an elliptical shape by passing the length of downsized generally cylindrical liner which exits the downsizing rollers through a set of shaping rollers having a liner receiving opening between the shaping rollers with a midpoint of the liner receiving opening of the shaping rollers located on the first axis, wherein the elliptically shaped liner has both a minor axis and a major axis;

after shaping the liner, feeding the elliptically shaped liner through an orienting means which turns the elliptically shaped liner about its major axis and guides the elliptically shaped liner along a second path of travel, wherein the second path of travel is oriented along a different axis from the axis of the first path of travel;

thereafter, passing the elliptically shaped liner through a set of reshaping rollers to reshape the length of the elliptically shaped liner into a generally cylindrical shape while retaining a downsized external diameter;

inserting the downsized, generally cylindrically shaped liner into the tubular member to be lined; and allowing the downsized liner to expand to substantially its original outside diameter to thereby secure the liner within the tubular member.

3. The method of claim 2, wherein the elastomer is a synthetic elastomer having known reverse expansion characteristics and wherein the degree of elongation which is effected is calculated to allow insertion of the liner within the tubular member, reverse expansion of the liner serving to tightly engage the liner within the internal diameter of the tubular member.

4. The method of claim 3, wherein the synthetic elastomer selected is a polyolefin.

5. The method of claim 4, wherein the polyolefin is polyethylene.

6. The method of claim 2, wherein the downsizing rollers are hemispherical rollers which are provided in sets, each set of hemispherical rollers being made up of a plurality of rollers which are offset at equal increments, each of the rollers having external roller surfaces which define a 360° region of contact with the liner.

7. The method of claim 2, wherein each set of downsizing rollers has a number of rollers, the liner is one liner or another liner, the outside diameter of the one liner is greater than the outside diameter of the another liner and the number of downsizing rollers provided for the one liner is greater than the number of rollers provided for the another liner.

8. The method of claim 2, wherein each roller in a downsizing set has a root diameter and an outer edge diameter, and wherein the ratio of roller root diameter to roller edge diameter exceeds about 87%.

9. The method of claim 2, wherein each set of downsizing rollers is spaced apart a preselected distance, the distance being selected to allow for elastic recovery of the liner before further downsizing at a next successive set of downsizing rollers.

10. The method of claim 2, wherein at least one set of the downsizing rollers is powered by a drive means, whereby the downsizing rollers frictionally engage the liner and move the liner in the direction of the shaping rollers.

11. A method of lining a sewer pipe extending below a ground surface which defines a horizontal plane of reference, the sewer pipe having an open interior which extends horizontally below the ground surface with a generally cylindrical, elastomeric liner having a leading end and a trailing end and an outside diameter which is initially greater than the inside diameter of the sewer pipe, the method comprising the steps of:

reducing a length of the generally cylindrical liner to a downsized outside diameter by feeding the leading end of the liner along a first horizontal axis which generally parallels the plane of the ground surface through multiple sets of downsizing rollers, each set of downsizing rollers having a liner receiving opening between the downsizing rollers with a midpoint of the liner receiving opening being located on the first horizontal axis, each set of downsizing rollers being arranged about the elastomeric liner to compress the liner at focussed wall compression zones and progressively downsize the liner, wherein each roller of one set of downsizing rollers has an axis of rotation and is positioned about the first axis so that its axis of rotation is at an angularly rotated position about the first axis relative to an axis of rotation of each roller of a preceding set of downsizing rollers to thereby maximize the number of focused wall compression zones and more uniformly distribute stress over the liner circumference, wherein the reducing step effects a linear elongation of the liner and the liner retains a standard dimensional ratio in the downsized condition;

shaping the liner from a generally cylindrical shape into an elliptical shape by passing the leading end of downsized generally cylindrical liner which exits the downsizing rollers through a set of shaping rollers having a liner receiving opening between the shaping rollers with a midpoint of the liner receiving opening of the shaping rollers located on the first horizontal axis wherein the elliptically shaped liner has both a minor axis and a major axis;

after shaping the liner, feeding the elliptically shaped liner through a first set of orienting rollers which guide the elliptically shaped liner through a 90° turn such the liner curves about its major axis when the liner turns;

thereafter, feeding the elliptically shaped liner through a second set of orienting rollers which guide the elliptically shaped liner through a second 90° turn such that the liner curves about its major axis when the liner turns and so that the length of the elliptically shaped liner exiting the second set of orienting rollers is oriented along a second horizontal axis generally parallel to the first horizontal axis, and the leading end of the liner is aligned with the sewer pipe;

passing the elliptically shaped liner through a set or reshaping rollers to reshape the length of the elliptically shaped liner into a generally cylindrical shape while retaining a downsized external diameter;

attaching a pulling head to the leading end of the liner and pulling the liner through the interior of the sewer pipe; and allowing the downsized liner to expand to substantially its original outside diameter to thereby secure the liner within the sewer pipe.

12. The method of lining a sewer pipe of claim 11, wherein the downsizing rollers are hemispherical rollers which are provided in sets, each set of hemispherical rollers being made up of at least four rollers which are offset at equal increments, each of the rollers having external roller surfaces which define a 360° region of contact with the liner.

13. The method of claim 12, wherein at least one set of downsizing rollers is powered by a drive means, whereby the downsizing rollers frictionally engage the liner and move the liner in the direction of the shaping rollers.

14. The method of claim 1 comprising the additional step of: feeding the elliptically shaped liner through an additional orienting means which turns the elliptically shaped liner and guides the elliptically shaped liner to the reshaping rollers.

15. The method of claim 14, wherein the length of the elliptically shaped liner exiting the additional orienting means is oriented along an axis generally parallel to the first axis and travels in the opposite direction of the first path of travel.

* * * * *